United States Patent Office 3,817,806
Patented June 18, 1974

---

3,817,806
METHOD FOR PRESTRESSING REINFORCED THERMOSET RESINS
Travis H. Anderson, Hayward, and Harvey H. Anderson, Superior, Wis., assignors to Acryltech, Incorporated, St. Paul, Minn.
Filed June 1, 1972, Ser. No. 258,540
Int. Cl. B29c 17/00; B32b 31/12
U.S. Cl. 156—161
9 Claims

ABSTRACT OF THE DISCLOSURE

A method for prestressing reinforced thermosetting resins which includes initially aligning fibrous materials, tensioning the same, holding this tension while encapsulating the fibrous material with a thermosetting resin and utilizing low pressure means to force the resin to go around and completely encapsulate the fibrous material and in addition to provide laminated structures wherein the aligned and tensioned fibrous material is bonded to a formable sheet of plastic material and the thermosetting resin encapsulates the fibrous material and bonds the same to the sheet material.

---

The concept of reinforcing plastic sheets is relatively old in the art and the common form for utilizing reinforced sheeting includes normally first forming a piece of sheet material, thereafter applying a fibrous material such as fiberglass thereagainst and bonding the same to the preformed material.

None of the fiberglassing concepts as recognized in the prior art include means for prestressing and tensioning the glass material prior to this bonding and prior to encapsulating the glass fibers or other fibrous material with the thermosetting resin.

It is an object of applicants' invention to provide a means for pretensioning to thereby align fiberglass or other fibrous materials and thereafter encapsulating the same with a thermosetting resin.

It is a further object of applicants' invention to provide a means for pretensioning fibrous materials such as glass fibers by holding the same and applying forming pressures thereto and encapsulating these now tensioned fibers with a thermosetting resin material and after the thermosetting material has hardened the fibers will remain in their pretensioned condition.

It is a further object of applicants' invention to provide a method for providing a laminate consisting of a first thermoformable sheet material with glass fibers that have been tensioned and held under such tension and bonded thereto with a thermosetting resin.

It is still a further object of applicants' invention to provide a laminate structure having a first thermoformable skin material, a tensioned and aligned fibrous material positioned thereagainst and bonded thereto with a thermosetting resin material and a second thermoformable sheet bonded to the opposite side of the pretensioned fibrous material.

These and other objects and advantages of applicants' invention will more fully appear from the following description made in connection with the accompanying drawings in which the same numerals are used to designate the same or similar parts throughout the views and in which.

Figure 1:
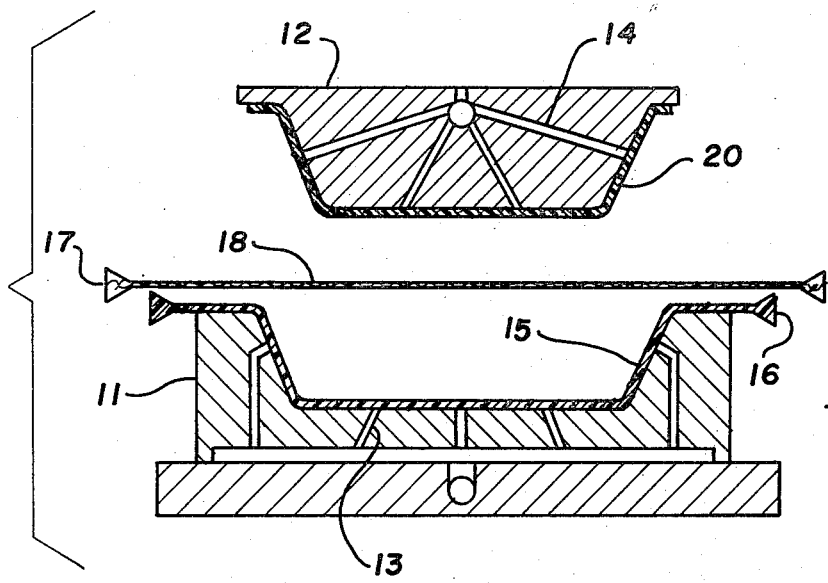
FIG. 1 is a schematic cross sectional illustration of a structure utilized for forming a pretensioned laminate structure in accordance with applicants' concept.

As illustrated in the accompanying drawings, in one form of the invention in which a prestressed thermoformable part having a predetermined shape is desired, a pair of what are known as matched dies 11, 12 are provided and these dies are of the vacuum type, well known in the art, having vacuum passages 13, 14 therein with means for moving the upper die 12 inwardly and outwardly of the lower die 11 to assist in forming the parts to be therein.

In a first form of the invention a vacuum thermoformable material 15 is provided within the lower die 11 and held therein during the forming process with clamping frame member 16 extending therearound. To originally form this sheet 15 to the shape of the lower die two methods can be utilized. A first method would be to initially heat the sheet 15 to its formable temperature and to assist the formation of the same by lowering the upper die 12 thereagainst and after lowering the same to a certain degree into the die 11, vacuum is applied to the lower die 11 and the sheet is formed. A second method to form this sheet 15 would be to simply heat the same to its thermoformable state place it along with its holding frame work 16 over the lower die 11 and to apply the vacuum thereto such that the sheet will basically be sucked onto the surface of the die 11. Either of these forms are available and are well known in the art.

The next step in providing the laminate structure is to provide a frame work 17 which has certain adjustable features for adjusting its length and width or peripheral shape and this frame work is provided to clamp a selected sheet of fibrous material and after such clamping in the frame work the fibrous material is stretched by shifting of the frame work 17 to both align and place the fibrous material under tension. Obviously this tension should exist evenly across the fibrous sheet 18 and therefore the framework may require adjustment in both dimensions. In utilizing this concept with the moveable upper die 12, the main theory of applicants' invention is to provide the alignment of fibers and the fibers will be tensioned by the pressure movement of the upper die 12 downwardly into the cavity of the lower die 11. Therefore in this method it can be obviously seen that a minimal amount of tension is initially required on the framing structure 17 as additional tensioning of the fibers will take place when the upper die 12 is forced into the lower die carrying the fibrous material 18 therealong. It is essential however that the clamping mechanism 17 properly hold the fibrous material during this forming process.

Applicants have found that although various fibrous materials are capable of undergoing this sort of pretensioning situation that fiberglass materials are most desirable from their own strength characteristics and that what is known as continuous strand fiberglass material may have more desirable characteristics than other such glass materials.

Figure 3:
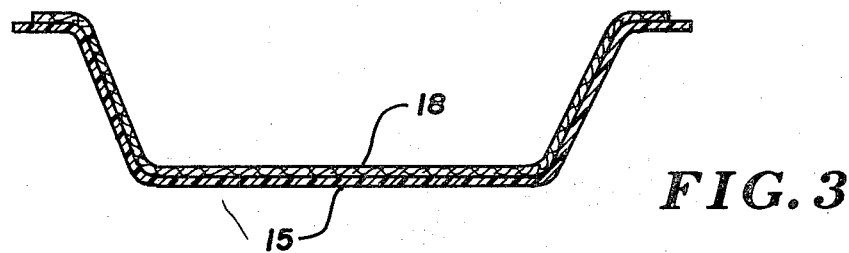
FIG. 3 is a cross section taken through the material as provided in one form of the applicants' invention.

During the formation of this first laminate a thermosetting resin is poured into a cavity of the die 11 containing a thermoformable sheet and the downward movement of the upper die under pressure will force this resin to flow around and entirely encapsulate the now tensioned fibers. This pressure is held until the resin gels and sets and thereafter the pressure is removed and the glass is now held under its pretensioned situation by the thermosetting resin. The thermosetting resin also bonds the fibrous material to the thermoformable sheet 15. Upon release of the vacuum holding pressure against the thermoformable sheet 15 the finished part my be released and a cross section thereof is illustrated in FIG. 3. The concept provided by applicants provides the fibers under stress and tension and therefore a greater structural integrity is obtained in such a prestressed condition in comparison to the unstressed type of fiberglass operation.

In FIG. 1 a second thermoformable sheet 20 is illustrated on the upper die 12. This thermoformable sheet is preformed in the same manner as the lower thermoformable sheet 15 has been preformed and the vacuum supplied to this die 12 holds the same thereagainst while the fibrous material 18 contained in its frame 17 is inserted between the two dies such that a laminate consisting of an interior and exterior skin may be provided which is bonded to the tensioned fibrous material through the application of the resins when the dies are closed and the resin sets. This concept is exactly the same in this situation except for the fact of providing both an interior and an exterior skin.

Figure 2:
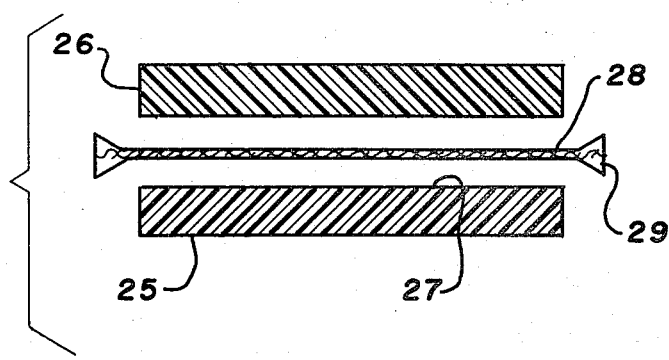
FIG. 2 is a second schematic cross section of a concept for pretensioning fibrous material and forming a laminate therewith in accordance with applicants' invention.

Applicant illustrates the means for providing a flat sheet of material in the form shown in FIG. 2.

In FIG. 2 dies 25, 26 may be provided and a first sheet material 27 may be placed on the lower die with fibrous material 28 being held and clamped by a frame work 29 arranged thereabove and placed thereon. In this situation the fibrous material is pretensioned by adjusting the frame work 29 and fibrous material resin material is placed on the lower material 27 and die pressure from movement of die 26 against die 25 will insure positive flow thereof and encapsulation of the fibrous material. Again with this device a single skin structure is shown but it should be obvious that an additional sheet of material may be provided above the fibrous sheet and the laminate then formed will have a skin on both sides thereof.

One concept which is directly similar to the concept described in FIG. 2 may further be provided and this would be to form a simple sheet of material through a simple, what could be termed non-pressure, cold flow process. In such a method the pretensioned fiberglass material carried in a frame would be simply placed on a flat surface and the resin would be throughly disbursed thereabout and therethrough such that the resulting member does not have any exterior skins and simply consists of the fibrous material being encapsulated in the thermosetting resin. Again the fibrous material has been pretensioned and a much more rigid structure than that obtained by using a non-tensioned sheet will be formed under such a process.

With applicants' concept the resin, which is a thermoset resin includes the field of polyesters, epoxies or other ester, acid or amine based materials. These resins are formulated to bond the fibrous material to the thermoformable or other skin material without the application of any other materials to this skin material. Very commonly in the prior art it is necessary to pre-condition the surface of these skin material prior to the bonding thereof.

The applicants' invention provides a formed part having a high structural integrity due to the pretensioning of the glass material and obviously a rigid matrix of the material after setting of the resins will take place. This then provides applicant with a part having great structural integrity and particularly provides a unit which will have a high tendency to resist deformation as the prestressing of the fibers will, if there is an attempt to shift them from their formed condition, assist in returning the unit to its formed position.

What we claim is:

1. A method for providing prestressed reinforced resins, including:
    a. providing a fibrous material;
    b. tensioning and holding under tension the fibrous material to align the fibers thereof; and
    c. providing a thermosetting resin to incapsulate said fibrous material.

2. The method set forth in claim 1 and providing a sheet of thermoformable material and placing the fibrous material thereagainst and bonding the same together with said resin.

3. The method set forth in claim 2 and preforming said thermoformable material to a predetermined shaped, holding said fibrous material above said shaped material and tensioning the same by forcing the same to conform to said shaped material.

4. The method set forth in claim 3 and means for providing said tensioning force including a pair of matched dies, one of such dies being movable for application of said tensioning force.

5. The method set forth in claim 1 and providing two sheet material members having said fibrous material and thermosetting resin therebetween.

6. The method set forth in claim 1 and said fibrous material including fiberglass.

7. The method set forth in claim 1 and said resin including an ester based resin.

8. The method set forth in claim 1 and said resin including an acid based resin.

9. The method set forth in claim 1 and said resin including an amine based resin.

References Cited

UNITED STATES PATENTS

| 3,686,048 | 8/1972 | Schirtzinger | 156—161 |
|---|---|---|---|
| 3,709,754 | 1/1973 | Medler | 156—161 |

WILLIAM A. POWELL, Primary Examiner

U.S. Cl. X.R.

156—285; 264—92, 257